(12) United States Patent
Gidvani et al.

(10) Patent No.: US 11,729,805 B2
(45) Date of Patent: Aug. 15, 2023

(54) METHOD AND SYSTEM FOR TRANSITIONING STATION TO UPLINK MULTI-USER DISABLE MODE AND UPLINK MULTI-USER ENABLE MODE

(71) Applicant: Samsung Electronics Co., Ltd., Gyeonggi-do (KR)

(72) Inventors: Ravi Gidvani, Fremont, CA (US); Sharan Naribole, San Jose, CA (US); Ashok Ranganath, San Jose, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/495,375

(22) Filed: Oct. 6, 2021

(65) Prior Publication Data

US 2022/0030596 A1 Jan. 27, 2022

Related U.S. Application Data

(63) Continuation of application No. 16/692,587, filed on Nov. 22, 2019, now Pat. No. 11,234,243.
(Continued)

(51) Int. Cl.
*H04W 80/02* (2009.01)
*H04W 84/12* (2009.01)
(Continued)

(52) U.S. Cl.
CPC .......... *H04W 72/53* (2023.01); *H04W 72/121* (2013.01); *H04W 72/535* (2023.01); *H04W 80/02* (2013.01); *H04W 84/12* (2013.01)

(58) Field of Classification Search
CPC .......... H04W 72/0493; H04W 72/121; H04W 72/1257; H04W 80/02; H04W 84/12;
(Continued)

(56) References Cited

U.S. PATENT DOCUMENTS 8,376,607 B2 * 2/2013 Fleury ...................... C08F 2/02
366/97
9,248,429 B2 * 2/2016 Peterson ................... C08F 2/01
(Continued)

FOREIGN PATENT DOCUMENTS

WO    WO 2019/005828       1/2019

OTHER PUBLICATIONS

Hang, Yang et al., "On Energy Saving in IEEE 802.11ax", IEEE Special Section on Energy Management in Buildings, Copyright 2018 IEEE, Aug. 16, 2018, pp. 11.
(Continued)

*Primary Examiner* — Harry H Kim
(74) *Attorney, Agent, or Firm* — The Farrell Law Firm, P.C.

(57) ABSTRACT

A method and system for providing transitioning a station (STA) to an uplink multi-user (UL MU) disable mode and to a UL MU enable mode is provided. According to one embodiment, a method includes entering, with the STA, a UL MU enable mode, and determining whether to transition the STA to a UL MU disable mode based on a predetermined interrupt condition. The predetermined interrupt condition is provided by the STA in the UL MU enable mode to transition the STA to the UL MU disable mode when the STA is unable to respond to a UL MU operation.

20 Claims, 7 Drawing Sheets

Related U.S. Application Data

(60) Provisional application No. 62/884,865, filed on Aug. 9, 2019.

(51) Int. Cl.

| | | |
|---|---|---|
| *H04W 74/06* | (2009.01) | |
| *H04W 48/16* | (2009.01) | |
| *H04W 74/00* | (2009.01) | |
| *H04W 24/04* | (2009.01) | |
| *H04W 24/08* | (2009.01) | |
| *H04W 72/12* | (2023.01) | |
| *H04W 74/08* | (2009.01) | |
| *H04W 72/53* | (2023.01) | |
| *H04W 72/121* | (2023.01) | |
| *H04W 72/50* | (2023.01) | |

(58) Field of Classification Search
CPC ... H04W 74/06; H04W 48/16; H04W 74/002; H04W 24/04; H04W 24/08; H04W 72/1215; H04W 74/0808

See application file for complete search history.

(56) References Cited

U.S. PATENT DOCUMENTS

| | | |
|---|---|---|
| 9,693,367 B2 | 6/2017 | Fang et al. |
| 9,712,666 B2 * | 7/2017 | Karimi-Cherkandi ....................... H04M 3/2236 |
| 9,853,740 B1 | 12/2017 | Bortz |
| 9,900,878 B2 | 2/2018 | Seok |
| 2016/0036572 A1 * | 2/2016 | Bhanage ............... H04B 7/0617 370/329 |
| 2016/0105836 A1 * | 4/2016 | Seok .................... H04W 72/23 370/331 |
| 2017/0223734 A1 | 8/2017 | Lin et al. |
| 2017/0279959 A1 * | 9/2017 | Karimi-Cherkandi ....................... H04L 5/006 |
| 2018/0014302 A1 | 1/2018 | Asterjadhi et al. |
| 2018/0062805 A1 | 3/2018 | Huang et al. |
| 2018/0110070 A1 * | 4/2018 | Yoshimura ............ H04W 72/20 |
| 2019/0174413 A1 | 6/2019 | Huang et al. |
| 2019/0208571 A1 | 7/2019 | Ahn |
| 2020/0029350 A1 * | 1/2020 | Asterjadhi ........ H04W 72/0446 |
| 2020/0077421 A1 * | 3/2020 | Asterjadhi ............. H04L 5/006 |
| 2020/0288496 A1 * | 9/2020 | Li ........................ H04L 5/0037 |

OTHER PUBLICATIONS

Afaqui, Shahwaiz et al., "IEEE 802.11ax: Challenges and Requirements for Future High Efficiency WiFi", IEEE Wireless Communications, Copyright 2016 IEEE, . . . Dec. 2016, pp. 10.

* cited by examiner

METHOD AND SYSTEM FOR TRANSITIONING STATION TO UPLINK MULTI-USER DISABLE MODE AND UPLINK MULTI-USER ENABLE MODE

PRIORITY

This application is a Continuation Application of U.S. patent application Ser. No. 16/692,587 filed on Nov. 22, 2019 in the United States Patent and Trademark Office, which is based on and claims priority under 35 U.S.C. § 119(e) to a U.S. Provisional patent application filed on Aug. 9, 2019 in the United States Patent and Trademark Office and assigned Ser. No. 62/884,865, the entire content of each of which is incorporated herein by reference.

FIELD

The present disclosure generally relates to wireless communication systems. In particular, the present disclosure is related to a system and method for providing Wi-Fi media access control (MAC) layer for uplink multi-user operating mode transitions by non-access point (non-AP) stations (STAs).

BACKGROUND

Uplink multi-user (UL MU) orthogonal frequency-division multiple access (OFDMA) technology is introduced in Institute of Electrical and Electronics Engineers (IEEE) 802.11ax standard to satisfy traffic requirements in dense wireless local area networks (WLANs).

In UL MU OFDMA technology, an access point (AP) contends on the Wi-Fi medium and sends a trigger signal that allocates resources to multiple STAs (e.g., a mobile device such as a mobile phone and a tablet, and a laptop) granting medium access. Due to radio resource sharing with other co-existing technologies and other reasons, a STA may not be able to participate in the UL MU operation. For such a purpose, the IEEE 802.1 lax standard enables the STAs to indicate their disability in participating in UL MU operation via an operating mode (OM) control subfield in IEEE 802.11 data and management frames. STAs may have UL MU operating mode enabled at association.

SUMMARY

According to one embodiment, a method for transitioning an STA to a UL MU disable mode includes entering, with the STA, a UL MU enable mode, and determining whether to transition the STA to a UL MU disable mode based on a predetermined interrupt condition. The predetermined interrupt condition is provided by the STA in the UL MU enable mode to transition the STA to the UL MU disable mode when the STA is unable to respond to a UL MU operation.

According to one embodiment, a system for transitioning an STA to a UL MU disable mode includes the STA configured to enter a UL MU enable mode, a memory, and a processor configured to determine whether to transition the STA to the UL MU disable mode based on a predetermined interrupt condition. The predetermined interrupt condition is provided by the STA in the UL MU enable mode to transition the STA to the UL MU disable mode when the STA is unable to respond to a UL MU operation.

According to one embodiment, a method for transitioning an STA to a UL MU enable mode includes entering, with the STA, a UL MU disable mode, and determining whether to transition the STA to the UL MU enable mode based on a predetermined interrupt condition. The predetermined interrupt condition is provided by the STA in the UL MU disable mode to transition the STA to the UL MU enable mode when the STA is able to respond to a UL MU operation.

According to one embodiment, a system for transitioning an STA to a UL MU enable mode includes the STA configured to enter a UL MU disable mode, a memory, and a processor configured to determine whether to transition the STA to the UL MU enable mode based on a predetermined interrupt condition. The predetermined interrupt condition is provided by the STA in the UL MU disable mode to transition the STA to the UL MU enable mode when the STA is able to respond to a UL MU operation.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
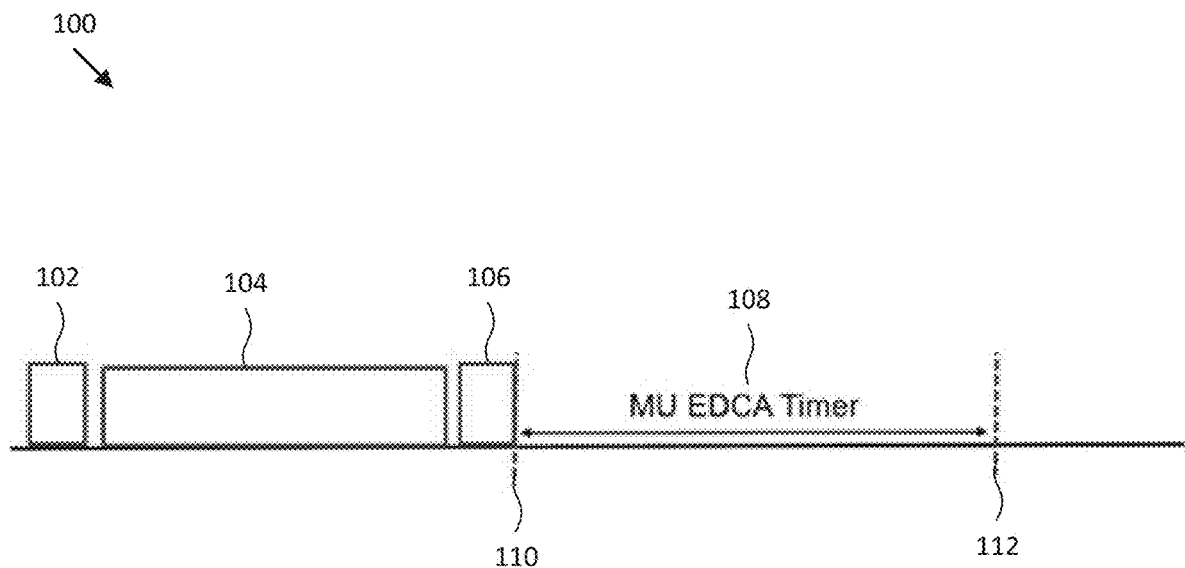
FIG. 1 illustrates a diagram of a multi-user (MU) enhanced distributed channel access (EDCA) countdown, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may be used interchangeably with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 illustrates a diagram 100 of a multi-user (MU) enhanced distributed channel access (EDCA) countdown, according to an embodiment. The countdown includes a trigger frame 102, data frames 104, and acknowledgement (ACK) 106, and an MU EDCA timer 108 with a start point 110 and an end point 112. By default, the STAs have the UL MU OM enabled at association. For UL MU disable mode, the OM control may be used to disable UL MU such that the STA switches to legacy EDCA mode for medium access. FIG. 1 is a general operation in UL enabled mode. Because the AP is additionally contending on the medium for trigger-based access to UL MU enabled STAs, it is undesirable for these STAs to further themselves to contend on the channel as that would be detrimental to the goals of reducing contention in the network. For this purpose, the MU EDCA mechanism was introduced. Right after a UL MU enabled STA successfully uses OFDMA resource unit (RU) grant from AP, for a temporary period called MU EDCA Timer, this STA will access the channel using a lower priority set of parameters called an MU EDCA parameter set. In the most extreme case, when the arbitration inter-frame spacing (AIFSn) equals 0 in the MU EDCA parameter set, the STAs have to fully disable their EDCA during the MU EDCA timer countdown 108.

The present system and method provide a UL MU operation including UL OFDMA and UL MU-multiple input multiple output (MIMO) systems. The present system and method provide decision making at the STA to decide when to participate in a UL MU operation and when to disable the UL MU operation.

Figure 2:
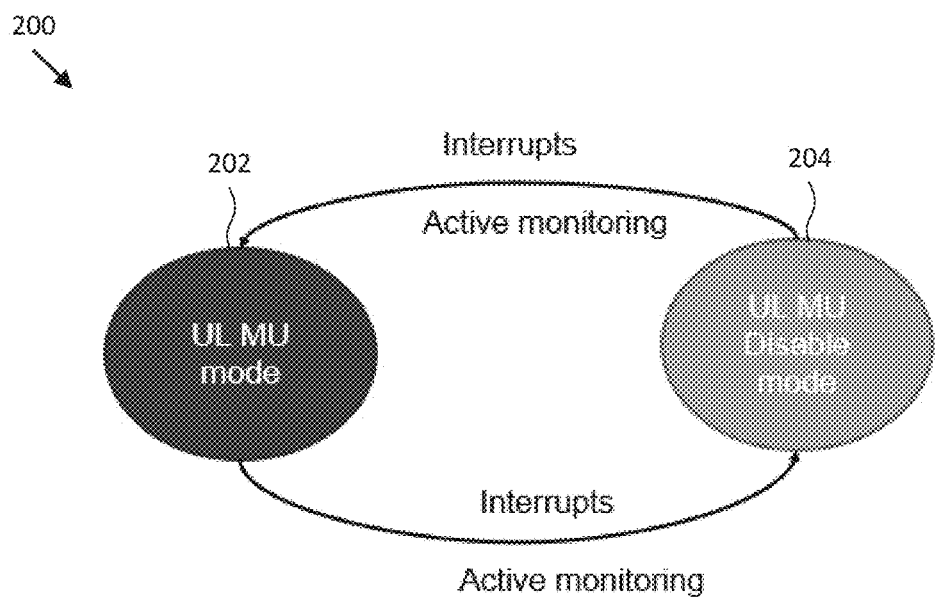
FIG. 2 illustrates a diagram providing a media access control (MAC) layer algorithm for operating mode transitions between UL MU enable mode and UL MU disable mode at non-AP STA, according to an embodiment.

FIG. 2 illustrates a diagram 200 providing a MAC layer algorithm for operating mode transitions between UL MU enable mode and UL MU disable mode at non-AP STA, according to an embodiment. The present system and method provide interrupt and active monitoring in UL MU enable mode, as well as interrupt and active monitoring in UL MU disable mode. The system may be in a UL MU enable mode 202 or a UL MU disable mode 204. Based on either interrupt conditions or determinations made by actively monitoring the state of the STA, the system may transition the UL MU enable mode 202 to the UL MU disable mode 204, and vice versa.

Figure 3:
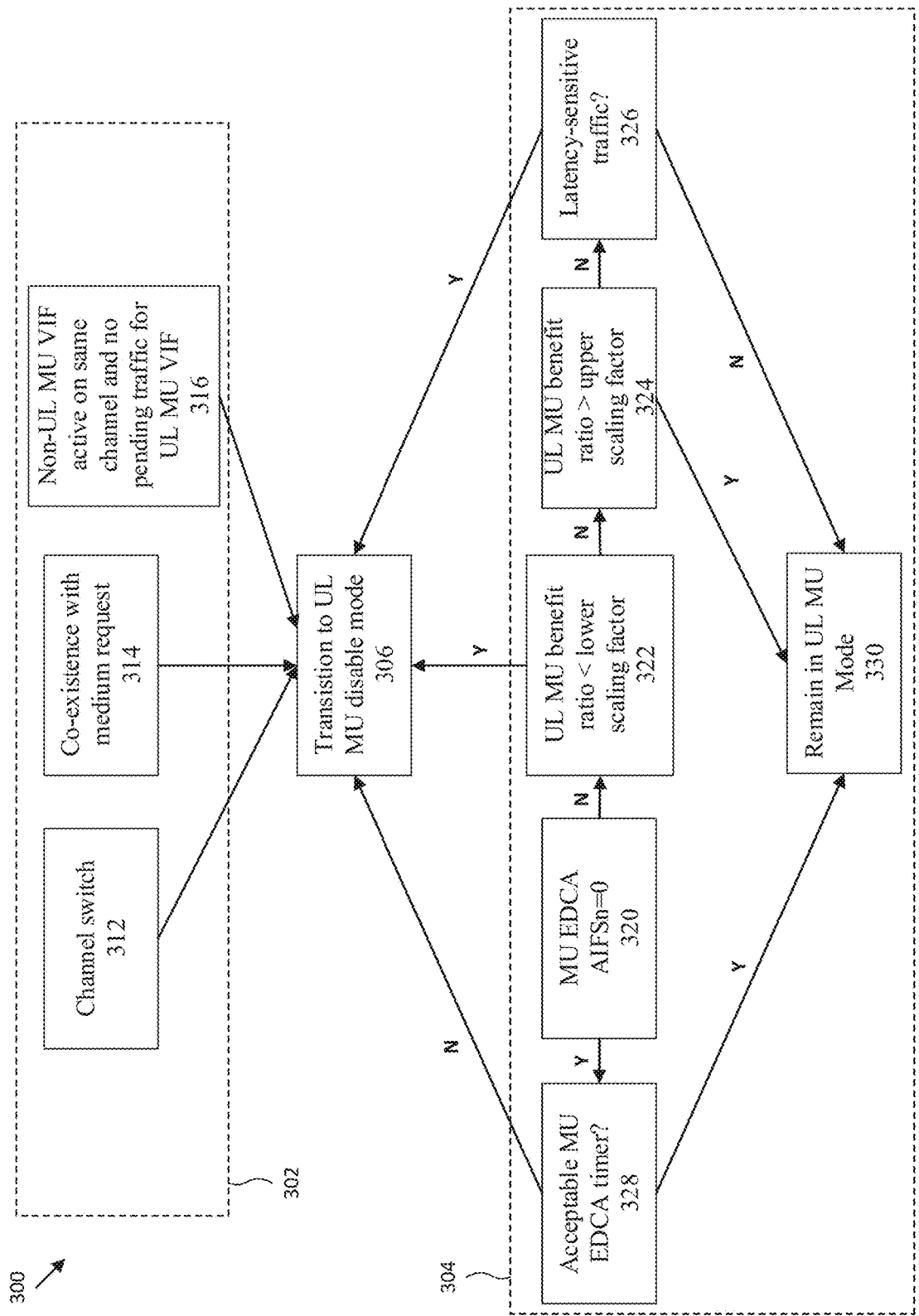
FIG. 3 illustrates a flowchart of a system having an STA in UL MU enable mode for transitioning to a UL MU disable mode, according to an embodiment.

FIG. 3 illustrates a flowchart 300 of a system having an STA in a UL MU enable mode to transition to a UL MU disable mode, according to an embodiment. The flowchart 300 depicts transitioning based on interrupt conditions 302 and transitioning based on active monitoring 304. The system provides interrupt conditions in UL MU enable mode to go to disable mode 306, in order to avoid participating in a UL MU operation where the STA might not be able to respond.

At 312, a second interrupt condition occurs when the UL MU is in the enable mode and channel switching occurs. A scanning mechanism is typically performed in regular intervals. The interrupt condition 302 occurs in a multi-virtual interface (VIF) scenario with non-UL MU VIF getting active and on different channels. Different operations are assigned their own VIFs. For example, scanning has its own VIF, STA to AP connection and data transmissions has its own VIF, peer-to-peer traffic has its own, VIF etc. Scanning a non-UL MU VIF on a different channel are two different examples of VIFs where channel switching will happen and STA won't be able to respond to AP's triggers. Scanning VIF requests for control in regular intervals and scanning typically includes hopping over channels and scanning network for APs. In this case, there is a channel switch involved. Similarly, there could be other VIFs for which channel switching might be required. The system disables UL MU mode when this channel switching is performed so that AP does not transmit Triggers to STA.

At 314, a third interrupt condition occurs when the UL MU is in the enable mode and there is co-existence with a medium request. For example, Bluetooth™ traffic may occur, and the resource scheduler in the firmware may transfer control to Bluetooth™ for a certain period of time, thereby transitioning to the UL MU disable mode 306.

At 316, a fourth interrupt condition occurs when a non-UL MU VIF is active on the same channel and there is no pending traffic for the UL MU, such that the UL MU transitions to the disable mode 306. If there is pending traffic, it may be more efficient to transmit the pending traffic, if possible, before transitioning to the UL MU disable mode 306.

The system may transition the STA from the UL MU enable mode to the UL MU disable mode 306 based on active monitoring 304. The system provides active monitoring in the UL MU enable mode to periodically assess a benefit or lack thereof in the UL MU enable mode. The system may include an active monitoring metric known as a UL MU benefit ratio during data transmission access that is trigger based, MU EDCA (during countdown) and legacy EDCA (after MU EDCA countdown). The benefit ratio may be determined as Equation (1).

$$UL\ MU\ \text{Benefit Ratio} = \frac{DTrigger}{(K*DMUEDCA) + DEDCA} \quad (1)$$

where in the previous N seconds (or other time units), $D_{Trigger}$ is data via triggered-access, $D_{MUEDCA}$ is data by MU EDCA access, $D_{EDCA}$ is data by legacy EDCA access, and K is the MU EDCA channel access de-prioritization factor.

At 320, the system determines if the MU EDCA parameter AIFSn is equal to 0. If not, the system compares the UL MU benefit ratio against a pre-defined threshold to determine whether to continue operating in the UL MU enable mode. At 322, the system determines whether the UL MU benefit ratio is less than a lower scaling factor. If the benefit ratio is less than the lower scaling factor, then the STA is not getting the benefit of the UL MU enable mode operation, and therefore the system transitions the STA to the disable mode 306. At 324, the system determines whether the UL MU benefit ratio is greater than an upper scaling factor. If the benefit ratio is greater than the upper scaling factor, then the STA is getting sufficient resources from the AP and can continue to remain in the UL MU enabled mode 306. At 326, the system determines whether there is latency sensitive traffic, when, for example, the benefit ratio is greater than the lower scaling factor but less than the upper scaling factor. If low latency traffic is being built up, the legacy EDCA may provide for faster channel access, so the system may transition to the disable mode 306. Otherwise, the system determines to remain in the enable mode 330.

When, at 320, the system determines that the AIFSn is equal to 0, the system, at 328, determines whether the MU EDCA timer is acceptable. Contention is disabled for the entire MU EDCA timer countdown so $D_{MUEDCA}=0$. After accessing the MU EDCA parameter set, if the parameters are not reasonable, then the system transitions the STA to the UL MU disable mode 306. Otherwise, the system determines that the STA is to remain in the UL MU enable mode 330.

The MU EDCA deprioritization factor is used to estimate the throughput if STA is instead in legacy EDCA while actually in MU EDCA mode. An example value of the deprioritization factor is provided as in Equation (2).

$$\frac{\sum_{k=1}^{M} CW \text{ max in } MU\ EDCA \text{ parameter set for access category } k}{\sum_{k=1}^{M} CW \text{ max in legacy } EDCA \text{ parameter set for access category } k} \quad (2)$$

Figure 4:
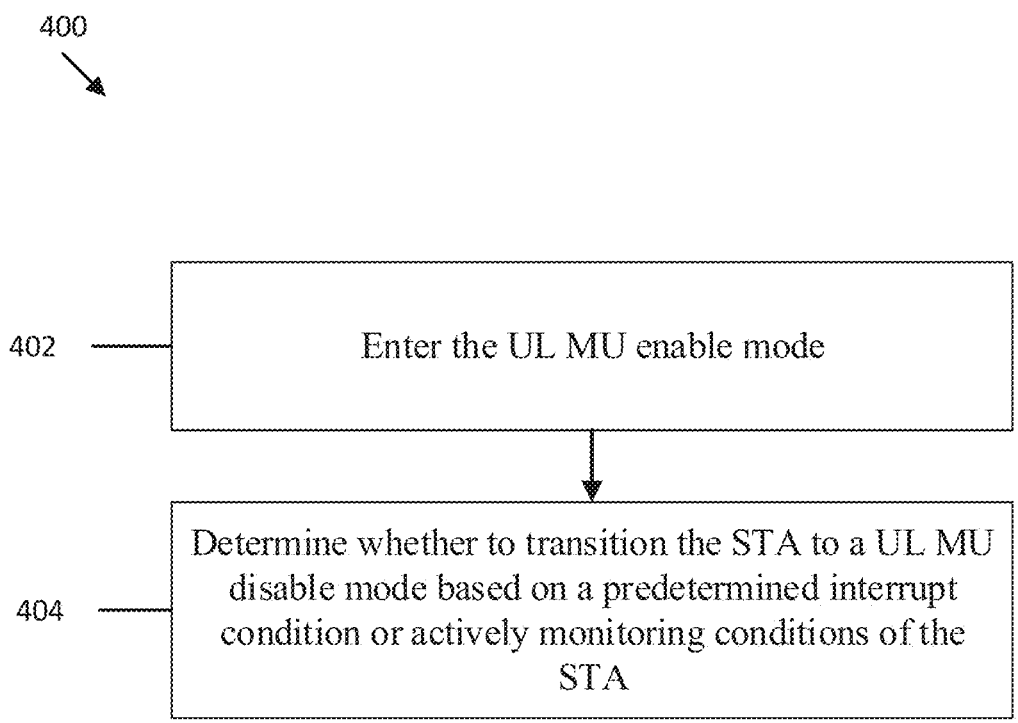
FIG. 4 illustrates a flowchart of a method for a system in a UL MU enable mode to determine whether to transition to a UL MU disable mode, according to an embodiment.

FIG. 4 illustrates a flowchart 400 of a method for a system in a UL MU enable mode to determine whether to transition to a UL MU disable mode, according to an embodiment. At 402, the STA enters the UL MU enable mode. At 404, the system determines whether to transition the STA to a UL MU disable mode based on a predetermined interrupt condition or actively monitoring conditions of the STA.

Figure 5:
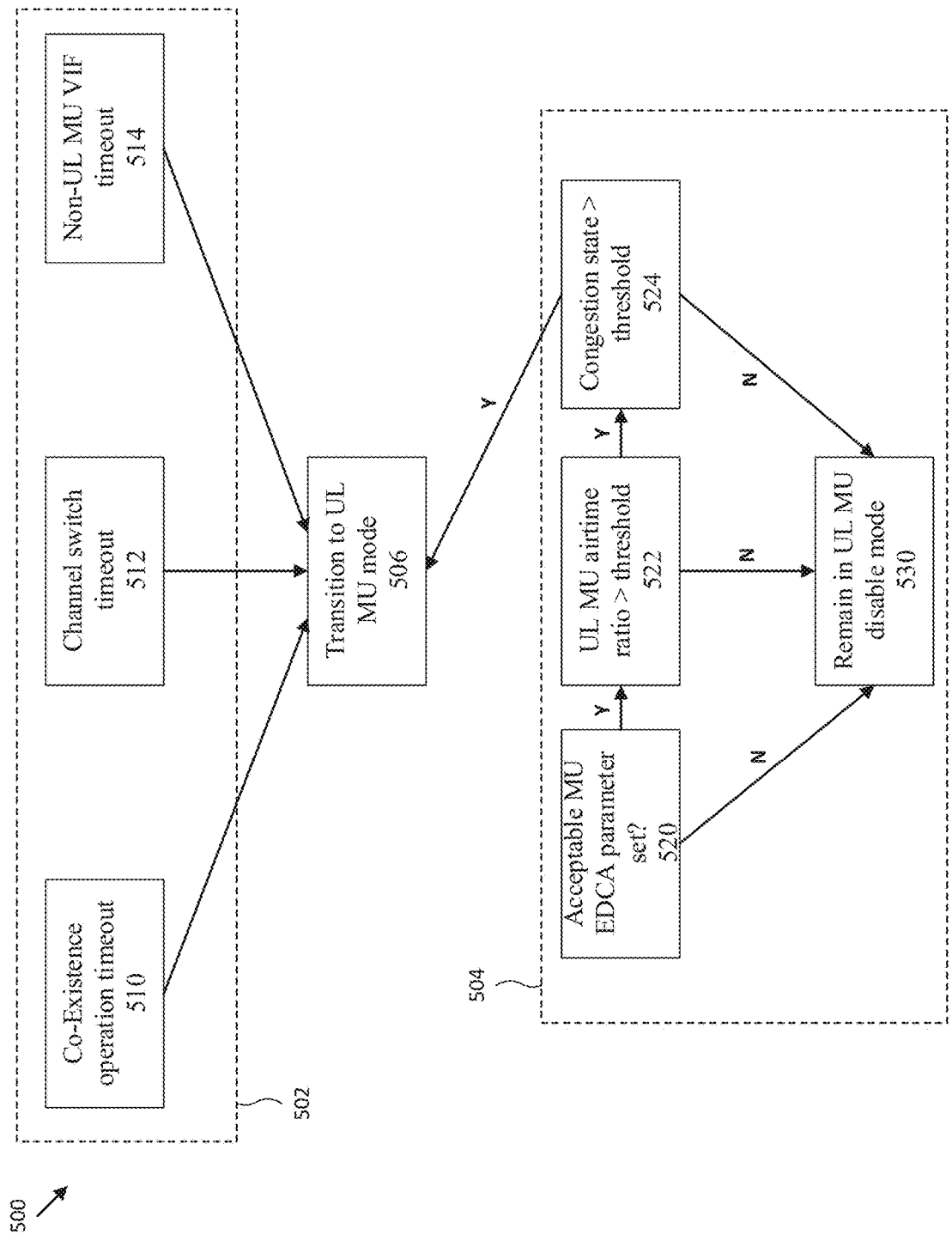
FIG. 5 illustrates a flowchart of a system with an STA in UL MU disable mode for transitioning to a UL MU enable mode, according to an embodiment.

FIG. 5 illustrates a flowchart 500 of a system with an STA in UL MU disable mode for transitioning to a UL MU enable mode 506, according to an embodiment. The flowchart 500 depicts transitioning based on interrupt conditions 502 and transitioning based on active monitoring 504. The interrupt conditions 502 may include a co-existence operation timeout at 510 (e.g., Bluetooth™ operation as described above), a channel switch timeout at 512 as described above, and a non-UL MU VIF timeout at 514 as described above. These interrupts correspond to the interrupts when STA transitioned from UL MU Enable mode to UL MU Disabled mode. Those interrupts are for temporary events (e.g., scanning, Bluetooth, etc.). Typically, there is a fixed time provided to these other VIFs by the VIF scheduler module. Accordingly, when the timeout happens for those VIFs, STA can return to UL MU Enabled mode as it switched to UL MU Disable mode due to these interrupts. In a congested and dense WLAN, EDCA may be a disadvantageous channel access mechanism. The packet error rate (PER) and mean backoff value may provide an estimate of the congestion of a network.

The system may determine to transition the STA from the UL MU disable mode to the UL MU enable mode 506 based on active monitoring 504. The system provides active monitoring in UL MU disable mode based on UL MU channel airtime for the STA to observe if a majority of the uplink traffic in the channel is going through UL MU.

Figure 6:
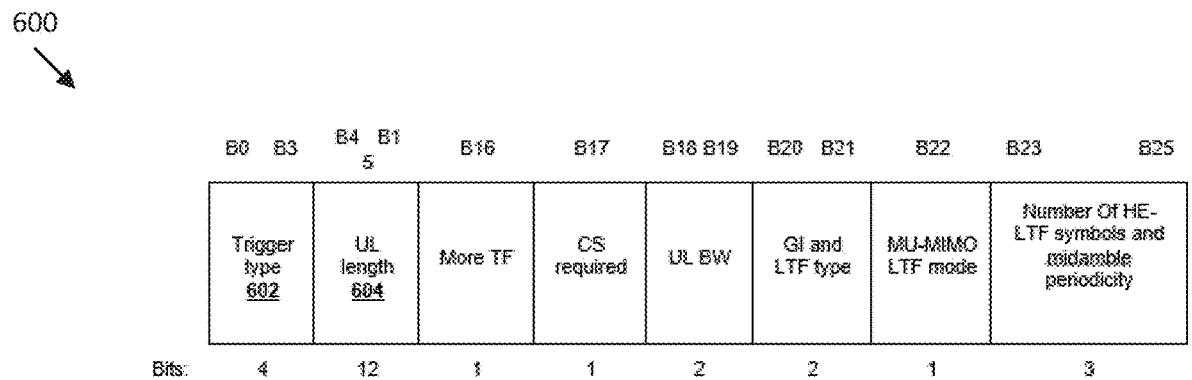
FIG. 6 illustrates a diagram of trigger frame common information fields, according to an embodiment.

FIG. 6 illustrates a diagram 600 of trigger frame common information fields, according to an embodiment. The fields include a trigger type field 602 and a UL length field 604. The trigger type field 602 indicates the BASIC type in which the system is interested, and the UL length field 604 indicates the time provided by the trigger to the STAs for uplink data transmissions. The STA hears the TFs from the AP and they are broadcast frames. TFs are processed in lower MAC.

To estimate the UL MU channel airtime in a basic service set (BSS), the system provides a metric known as a UL MU airtime ratio to estimate radio airtime being utilized for UL MU operation in the BSS. A basic trigger type in the IEEE 802.11 ax specification identifies the UL MU data triggers. The UL MU transmission time may be represented by a function of UL length as defined in the IEEE 802.11 ax specification.

Referring to FIG. 5, at 520, the system determines whether the MU EDCA parameter set is acceptable. If not, the system determines that the STA should remain in the UL MU disable mode 530. If yes, then at 522, the system determines whether the UL MU airtime ratio is greater than a predetermined threshold. For example, the threshold can be a number between 0 and 1. The traffic in the network can be classified into uplink traffic and downlink traffic. The STA is assessing how much airtime in the network is being spent on UL MU transmissions. Downlink traffic is usually much higher than uplink traffic, so the threshold could be a value of 0.25, for example. If an STA hears/receives M UL MU data triggers in previous N seconds, then the UL MU airtime ratio may be provided as in Equation (3).

$$UL\ MU\ airtime\ ratio = \frac{\sum_{k=1}^{M} f(UL\ Length\ in\ kth\ UL\ MU\ Data\ Trigger)}{N\ seconds} \quad (3)$$

If the UL MU airtime ratio is less than the threshold, the system determines the STA should remain in the UL MU disable mode 530. If the UL MU airtime ratio is greater than the threshold, then, at 524, the system determines whether a congestion state is greater than a predetermined congestion threshold. The STA can determine that sufficient airtime in the channel is being spent in UL MU operation. The system may further combine the UL MU airtime ratio with other congestion metrics including PER and mean backoff values crossing a pre-defined threshold to determine whether the STA switches to UL MU enable mode. If the congestion state is greater than the congestion threshold, then the system transitions the STA to the UL MU enable mode 506. Otherwise, the STA remains in the UL MU disable mode 530.

Figure 7:
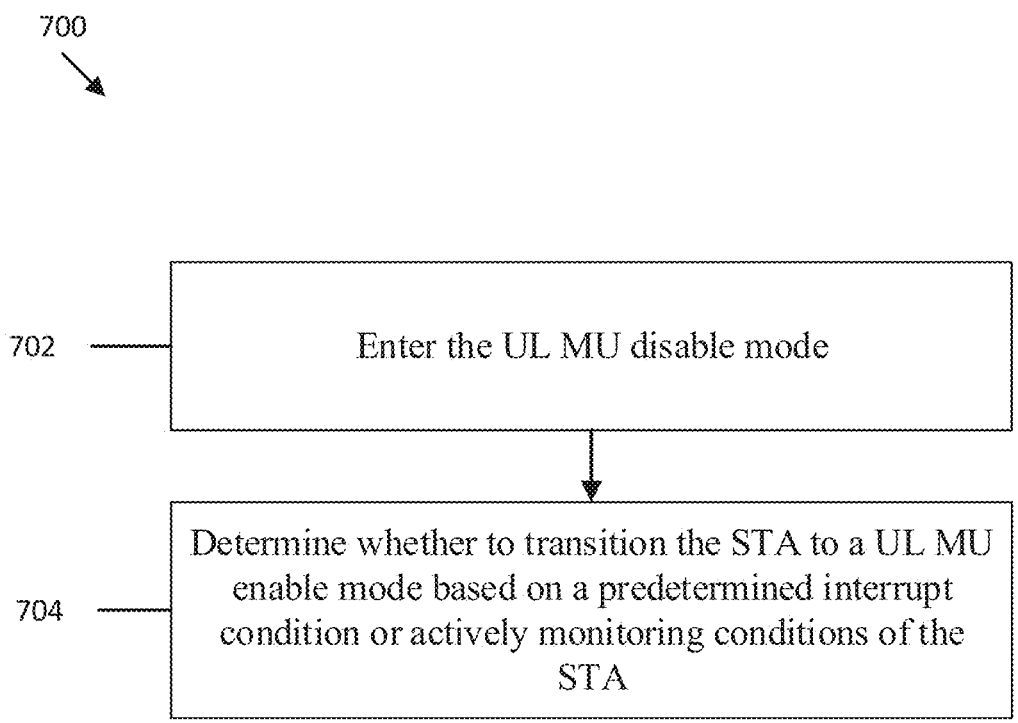
FIG. 7 illustrates a flowchart of a method for a system with an STA in a UL MU disable mode to determine whether to transition to a UL MU enable mode, according to an embodiment.

FIG. 7 illustrates a flowchart 700 of a method for a system with an STA in a UL MU disable mode to determine whether to transition to a UL MU enable mode, according to an embodiment. At 702, the STA enters the UL MU disable mode. At 704, the system determines whether to transition the STA to a UL MU enable mode based on a predetermined interrupt condition or actively monitoring conditions of the STA.

Figure 8:
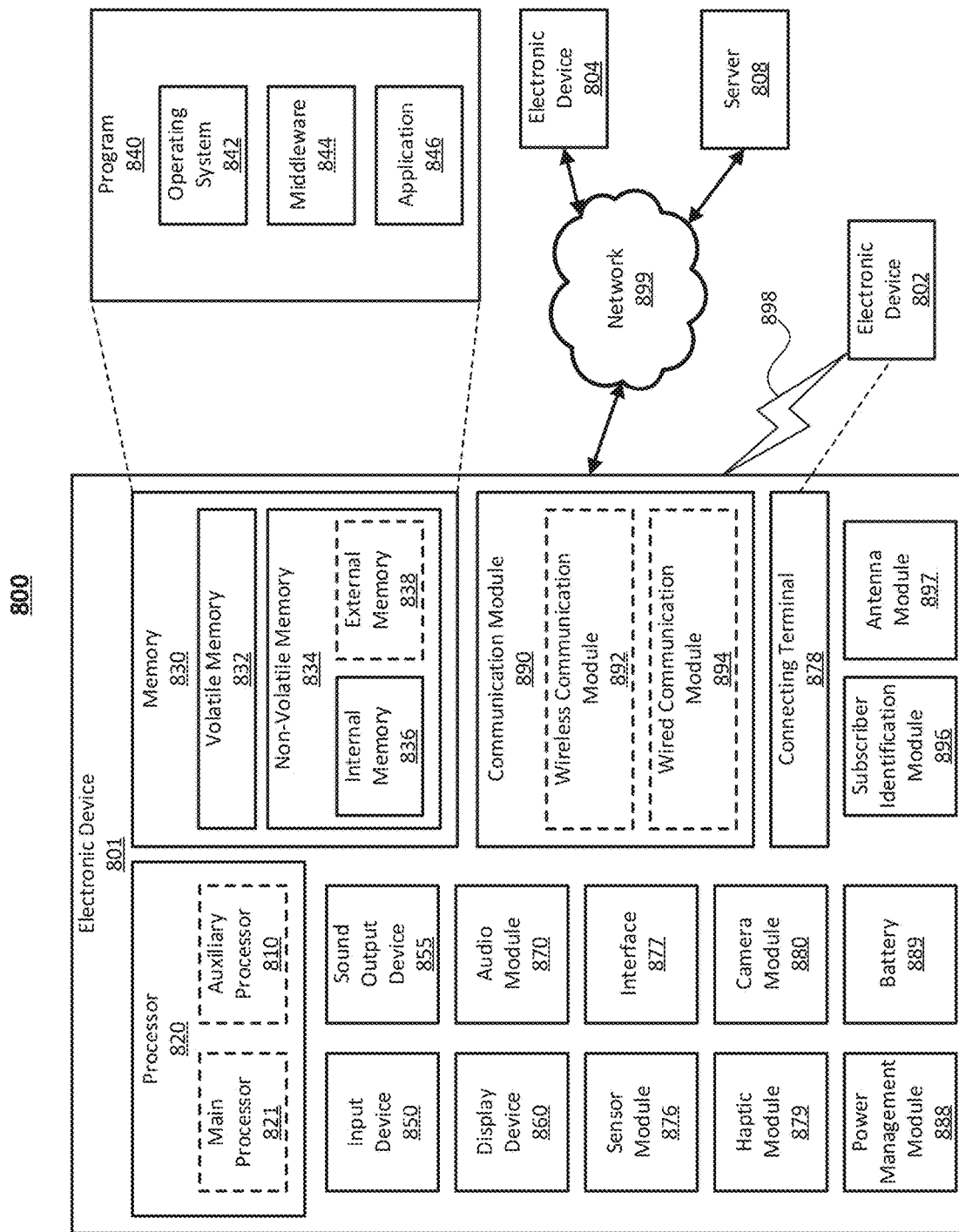
FIG. 8 illustrates a block diagram of an electronic device in a network environment, according to one embodiment.

FIG. 8 illustrates a block diagram of an electronic device 801 in a network environment 800, according to one embodiment. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. The power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for transitioning a station (STA) to an uplink multi-user (UL MU) disable mode, comprising:

entering, with the STA, a UL MU enable mode;

calculating a value of a predetermined interrupt condition according to MU enhanced distributed channel access (EDCA) data and legacy EDCA data; and determining whether to transition the STA to a UL MU disable mode by comparing the value of the predetermined interrupt condition to a predefined threshold, wherein the predetermined interrupt condition is provided by the STA in the UL MU enable mode to transition the STA to the UL MU disable mode when the STA is unable to respond to a UL MU operation.

2. The method of claim 1, wherein the predetermined interrupt condition includes an occurrence of channel switching in the UL MU enable mode.

3. The method of claim 1, wherein the predetermined interrupt condition includes an occurrence of a co-existence with a medium request in the UL MU enable mode.

4. The method of claim 1, wherein the predetermined interrupt condition includes an occurrence of a non-UL MU virtual interface (VIF) active on the same channel as a UL MU VIF in the UL MU enable mode.

5. The method of claim 4, wherein if traffic is pending when the non-UL MU VIF is active on the same channel as the UL MU VIF in the UL MU enable mode, then the traffic is transmitted before transitioning to the UL MU disable mode.

6. A system for transitioning a station (STA) to an uplink multi-user (UL MU) disable mode, comprising:

the STA configured to enter a UL MU enable mode;

a memory; and a processor configured to:

calculate a value of a predetermined interrupt condition according to MU enhanced distributed channel access (EDCA) data and legacy EDCA data, and determine whether to transition the STA to the UL MU disable mode by comparing the value of the predetermined interrupt condition to a predefined threshold, wherein the predetermined interrupt condition is provided by the STA in the UL MU enable mode to transition the STA to the UL MU disable mode when the STA is unable to respond to a UL MU operation.

7. The system of claim 6, wherein the predetermined interrupt condition includes an occurrence of channel switching in the UL MU enable mode.

8. The system of claim 6, wherein the predetermined interrupt condition includes an occurrence of a co-existence with a medium request in the UL MU enable mode.

9. The system of claim 6, wherein the predetermined interrupt condition includes an occurrence of a non-UL MU virtual interface (VIF) active on the same channel as a UL MU VIF in the UL MU enable mode.

10. The system of claim 9, wherein if traffic is pending when the non-UL MU VIF is active on the same channel as the UL MU VIF in the UL MU enable mode, then the traffic is transmitted before transitioning to the UL MU disable mode.

11. A method for transitioning a station (STA) to an uplink multi-user (UL MU) enable mode, comprising;
   entering, with the STA, a UL MU disable mode; and
   determining whether to transition the STA to the UL MU enable mode based on a predetermined interrupt condition,
   wherein the predetermined interrupt condition is provided by the STA in the UL MU disable mode to transition the STA to the UL MU enable mode when the STA is able to respond to a UL MU operation, and
   wherein the predetermined interrupt condition includes an occurrence of a timeout operation in the UL MU disable mode.

12. The method of claim 11, wherein the timeout operation in the UL MU disable mode is a channel switching timeout operation.

13. The method of claim 11, wherein the timeout operation in the UL MU disable mode is a co-existence with a medium request timeout operation.

14. The method of claim 11, wherein the timeout operation in the UL MU disable mode is a non-UL MU virtual interface (VIF) active on the same channel as a UL MU VIF timeout operation.

15. The method of claim 11, further comprising:
   transitioning the STA to the UL MU enable mode based on the predetermined interrupt condition; and
   transitioning the STA back to the UL MU disable mode after a timeout happens for the predetermined interrupt condition in the UL MU enable mode.

16. A system for transitioning a station (STA) to an uplink multi-user (UL MU) enable mode, comprising;
   the STA configured to enter a UL MU disable mode;
   a memory; and
   a processor configured to determine whether to transition the STA to the UL MU enable mode based on a predetermined interrupt condition or actively monitoring conditions of the STA,
   wherein the predetermined interrupt condition is provided by the STA in the UL MU disable mode to transition the STA to the UL MU enable mode when the STA is able to respond to a UL MU operation, and
   wherein the predetermined interrupt condition includes an occurrence of a timeout operation in the UL MU disable mode.

17. The system of claim 16, wherein the timeout operation in the UL MU disable mode is a channel switching timeout operation.

18. The system of claim 16, wherein the timeout operation in the UL MU disable mode is a co-existence with a medium request timeout operation.

19. The system of claim 16, wherein the timeout operation in the UL MU disable mode is a non-UL MU virtual interface (VIF) active on the same channel as a UL MU VIF timeout operation.

20. The system of claim 16, wherein the processor is further configured to:
   transition the STA to the UL MU enable mode based on the predetermined interrupt condition; and
   transition the STA back to the UL MU disable mode after a timeout happens for the predetermined interrupt condition in the UL MU enable mode.

* * * * *